UNITED STATES PATENT OFFICE.

EDMUND TWEEDY, OF DANBURY, CONNECTICUT, AND HENRY L. BREVOORT AND ISAIAH L. ROBERTS, OF BROOKLYN, NEW YORK.

PROCESS OF PREPARING FUR FOR FELTING.

SPECIFICATION forming part of Letters Patent No. 339,348, dated April 6, 1886.

Application filed May 20, 1885. Serial No. 166,180. (No specimens.)

*To all whom it may concern:*

Be it known that we, EDMUND TWEEDY, a resident of the town of Danbury, in the county of Fairfield and State of Connecticut, and HENRY L. BREVOORT and ISAIAH L. ROBERTS, residents of the city of Brooklyn, county of Kings, and State of New York, all citizens of the United States, have invented a new and useful Process for Preparing Fur for Felting, of which the following is a full, clear, and exact description, which will enable others skilled in the art to which it appertains to practice and use the same.

It has been customary to treat fur before felting with a solution of nitrate of mercury. Our theory is, that there is a coating of greasy matter upon each fiber of the fur, and that this must be chemically changed before the hot water used in the felting operation can reach the fur itself, and that the nitrate of mercury renders this coating soluble. This treatment is disadvantageous, as it somewhat injures the fur, and the mercury causes serious injury to the workmen who apply it to the fur, and to those engaged in the subsequent manufacture of the hats.

Our invention consists in treating the fur with permanganate of potash dissolved in water, which is a strong oxidizer; but we may use other permanganates besides that of potash, such as permanganate of soda and the like. A solution of permanganate in water, preferably saturated, is applied to the fur upon the skins, preferably in the same way that the solution of mercury is now applied, though other methods of wetting the fur with the aforesaid solution may be adopted. After the solution is applied the skins, with the fur upon them, may be dried at the ordinary temperature of the atmosphere, or by artificial heat.

In practice, we have obtained the best results by using a solution composed of one (1) pound of permanganate of potash in four (4) gallons of water at about 80° Fahrenheit, applying it thoroughly to the fur on the skins by rubbing with a brush, and afterward drying the fur in an oven raised to a temperature of about 150° Fahrenheit. We have added a small quantity of acid to the solution with good effect—say about one (1) fluid ounce of sulphuric or muriatic acid to one gallon of the permanganate solution.

The fur treated by our process will make excellent felt.

The theory of our process is this: We believe that some substance exists on the surface of the fur which is a water-repellent, and which may be altered chemically or possibly made soluble, so that the water necessary in the felting operation may be brought in contact with the fur. With our process this substance upon the surface of the fur is oxidized, and its water-repellent properties are thus destroyed. However, whether this theory is correct or not, the advantageous results hereinbefore referred to are obtainable by the practice of the process described in the specification.

What we claim, and desire to secure by Letters Patent, is—

1. The process of preparing fur so that it may be in a condition suitable for felting, which consists in treating the fur with permanganate of potash or other permanganate in solution, substantially as described.

2. The process of preparing fur for felting, which consists in treating fur upon the skins by a solution of permanganate of potash in water, and, second, drying the skins by artificial heat, substantially as described.

3. The treatment of fur prior to felting by means of a solution of permanganate of potash in water, to which is added a proportion of acid, substantially in the manner described.

4. As a new article of manufacture, fur prepared for felting by the process herein described.

EDMUND TWEEDY.
    HENRY L. BREVOORT.
    ISAIAH L. ROBERTS.

Witnesses:
 JOSEPH L. LEVY,
 B. T. VETTERLEIN.